United States Patent [19]

McDonald

[11] 4,416,244
[45] Nov. 22, 1983

[54] CONTROL SYSTEM FOR A DUAL FUEL INTERNAL COMBUSTION ENGINE

[75] Inventor: Ross W. McDonald, Bartholomew, Ind.

[73] Assignee: Cummins Engine Company, Inc., Columbus, Ind.

[21] Appl. No.: 334,374

[22] Filed: Dec. 24, 1981

[51] Int. Cl.³ .............................................. F02B 7/02
[52] U.S. Cl. .................................... 123/577; 123/525; 123/27 GE
[58] Field of Search ............... 123/575, 577, 525, 527, 123/27 GE

[56] References Cited

U.S. PATENT DOCUMENTS

| | | | |
|---|---|---|---|
| 2,793,629 | 5/1957 | Neely | 123/575 |
| 2,947,291 | 8/1960 | Klinge | 123/575 |
| 3,308,794 | 3/1967 | Bailey | 123/575 |
| 4,227,497 | 10/1980 | Mathieson | 123/575 |

FOREIGN PATENT DOCUMENTS 769054 10/1980 U.S.S.R. .............................. 123/577

Primary Examiner—Charles J. Myhre
Assistant Examiner—E. Rollins Cross
Attorney, Agent, or Firm—Neuman, Williams, Anderson & Olson

[57] ABSTRACT

A control system is provided for regulating the fuel feed to a dual fuel internal combustion engine. The engine includes a source of first fuel, a pump therefor, and a source of second fuel under a predetermined pressure. A first valve is mounted within a first feed line connecting the engine to the pump outlet. A second valve is mounted within a second feed line connecting the engine to the pump outlet. A third valve is mounted within a third feed line connecting the engine to the second fuel source. A pressure-sensitive metering valve is disposed within the third feed line downstream of the third valve. A means is provided which transmits the flow pressure from the second valve to the metering valve and thus, determines the setting of the latter. A control means, adjustable between two modes, is operatively connected to the first, second, and third valves. When the control means is in a first mode, the first valve is open and both the second and third valves are closed whereby only the first fuel is fed to the engine. When the control means is in a second mode, the first valve is closed and both the second and third valves are open whereby both the first and second fuels are simultaneously fed to the engine. The ratio of the second fuel to the first fuel being fed to the engine, when the control means is in the second mode, is determined by the setting of the metering valve when said control means is in said second mode.

11 Claims, 2 Drawing Figures

CONTROL SYSTEM FOR A DUAL FUEL INTERNAL COMBUSTION ENGINE

BACKGROUND OF THE INVENTION

Because of the uncertainty in various geographical regions throughout the world as to the supply and cost of liquid hydrocarbon fuel, the dependence of these regions on such fuel as the sole fuel for internal combustion engines and the like, has adversely affected the economic stability and industrial development of such regions. On the other hand, certain of these regions have ready access to an inexpensive source of natural gas (CNG) and/or to a source of liquified petroleum gas (LPG) and thus, to utilize these sources to supplement the liquid hydrocarbon fuel would significantly improve the stability and development of these regions.

Various systems have heretofore been proposed, particularly with regard to diesel engines, in an effort to effectively supplement the fuel oil with a gaseous fuel. Such systems, however, have been beset with one or more of the following shortcomings: (a) the system is of a costly, bulky and complex construction; (b) the installation of the system requires substantial modification of the engine design; (c) the system is prone to malfunction; (d) the system is effective only within a narrow operating range of the engine; (e) the system requires an inordinate amount of service and maintenance; (f) the savings in fuel oil costs is only nominal; and (g) the system adversely affects the responses of the engine to various power demands.

SUMMARY OF THE INVENTION

Thus, it is an object of the invention to provide an improved control system for a dual fuel internal combustion engine which avoids the aforenoted shortcomings associated with prior systems of this type.

It is a further object to provide an improved system of the type herein described which may be utilized effectively with internal combustion engines which vary in size and horsepower rating over a wide range.

It is a further object to provide an improved system of the type herein described wherein the fuel source for the engine can be readily switched from a single source to dual sources without requiring shutdown of the engine.

It is a still further object to provide an improved system of the type herein described wherein the proportion of the secondary or supplementary fuel supplied to the engine will be substantially consistent over the operating range of the engine.

Further and additional objects will appear from the description, accompanying drawings, and appended claims.

In accordance with one embodiment of the improved system a first valve is provided which is connected to the outlet of a variable speed first fuel pump. The first valve is disposed within a first feed line connecting the engine to the outlet of the fuel pump. A second feed line is also provided which connects the fuel pump outlet to the engine. A second valve is disposed within the second feed line. The first fuel flows through the second valve and the second feed line only when the first valve is closed. A third valve is provided which is disposed within a third feed line connecting the engine to a pressurized source of a second fuel. Also disposed within the third feed line and downstream of the third valve is a pressure-responsive metering valve. The flow pressure of the first fuel through the second valve is transmitted to the metering valve and the setting of the latter is dependent upon the transmitted flow pressure. Thus, the ratio of the second fuel flow to the first fuel flow is determined by the setting of the metering valve. An adjustable control is provided which is operatively connected to the first, second, and third valves and when in one position of adjustment causes the first valve to open and the second and third valves to be closed, whereby the engine operates with only one of the two fuels available. When the control is in a second position of adjustment, the first valve is closed and the second and third valves are opened resulting in the engine operating on a mixture of both fuels.

DESCRIPTION

For a more complete understanding of the invention, reference should be made to the drawing wherein.

Figure 1:
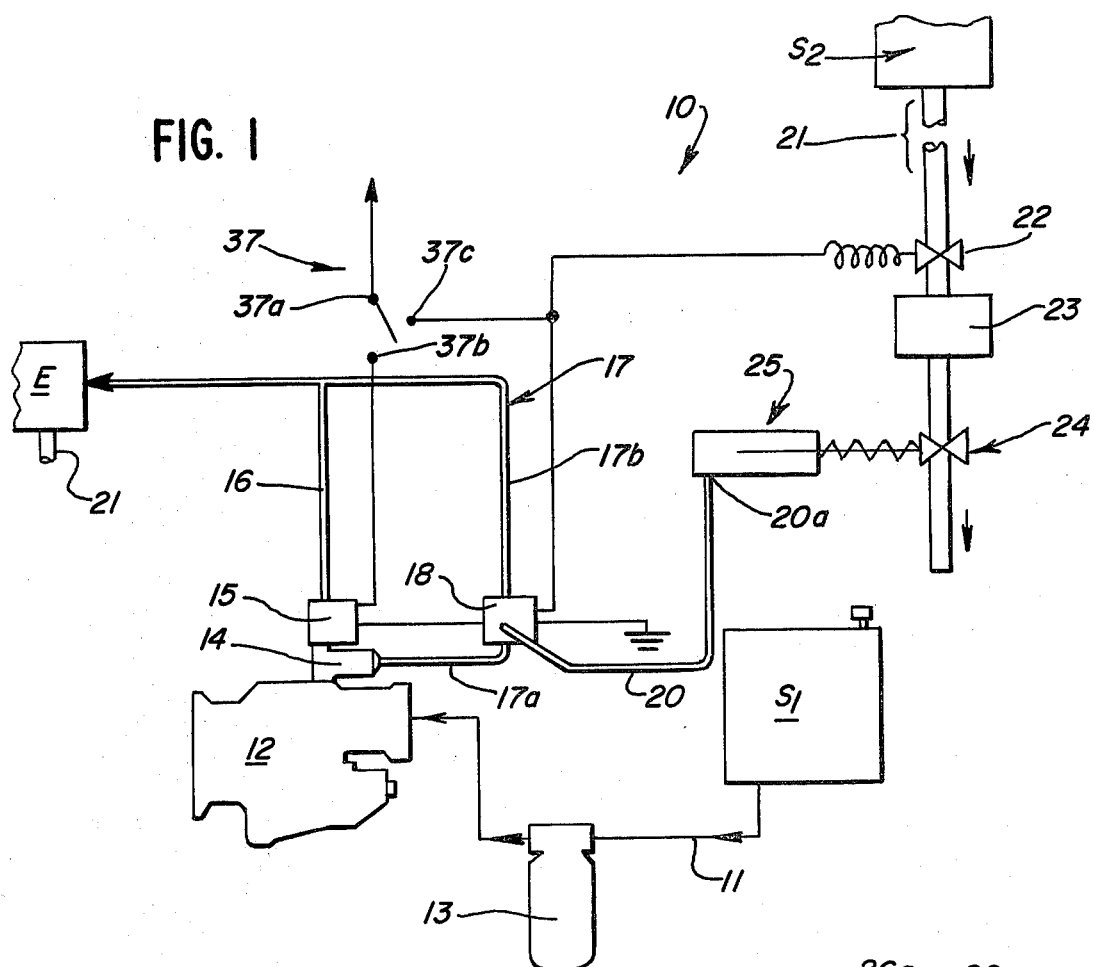
FIG. 1 is a schematic view of one embodiment of the improved control system.

Referring now to the drawing and more particularly to FIG. 1, one form of the improved control system 10 is shown which is adapted for use on an internal combustion engine E having dual fuel sources $S_1$, $S_2$. For purposes of facilitating understanding the improved system, the latter will be described with reference to a diesel powered engine utilizing a liquid hydrocarbon and compressed natural gas (CNG) as the available fuel sources $S_1$, $S_2$.

The liquid hydrocarbon (oil) is stored in conventional tank $S_1$ having an exposed fill port F provided at the top of the tank and normally closed by a screw-type cap C. The natural gas supply may be provided from a pressurized cylinder of conventional design. The capacity of the cylinder may vary according to the size and rating of the engine and the anticipated power demands of the engine. The cylinder is preferred to be of a type which is readily capable of being recharged when required.

Extending from the oil supply tank $S_1$ is a flow line 11 which supplies oil to the input side of a conventional variable speed pump 12. It is customary for a filter 13 to be disposed within the line 11. Connected to the output side of pump 12 is a T-connector 14 having two outlets. To one of the outlets is connected a first valve 15 which is preferably solenoid actuated. The outlet side of valve 15 is connected to one end of a first fuel line or rail 16. The opposite end of fuel line 16 is connected to the fuel intake manifold or directly to the various fuel injectors utilized in the engine.

The second outlet of the T-connector 14 is connected to a section 17a of a bypass fuel line 17. The line section 17a connects with a second solenoid actuated valve 18. Valve 18 has an outlet orifice of reduced size connected to a second section 17b of the bypass fuel line 17. In the illustrated embodiment line section 17b is shown joining the feedline 16 at some point between valve 15 and the engine. If desired, however, line section 17b may be connected directly to the engine's fuel intake manifold.

Leading from valve 18 or from line section 17a is a fuel pressure line 20, the function of which will be described more fully hereinafter. Fuel from pump 12 will flow through valve 18 only when valve 15 assumes a closed position and valve 18 assumes its open position.

The source of compressed natural gas S$_2$, which is stored in a suitable pressurized cylinder, flows from the latter to the air intake manifold of the engine E through a suitable feedline 21. The line 21 may be flexible and is required to be strong enough to withstand substantial internal gas pressures (e.g. 100 psi).

Disposed within feedline 21 is a third solenoid actuated valve 22. The valve 22 is a safety valve and normally remains closed except when both types of fuel are to be simultaneously fed to the engine. A conventional regulator 23 may be disposed within line 21 downstream from the third valve 22. Regulator 23 serves to reduce tank pressure to a level suitable for metering.

Downstream of regulator 23 and disposed within line 21 is a metering valve 24, the setting of which is responsive to the flow or rail pressure of the fuel maintained within line 20. The pressure maintained in line 20 is directly related to the load demands imposed on the engine E; such demands in turn are directly reflected by the impeller speed of the pump.

Figure 2:
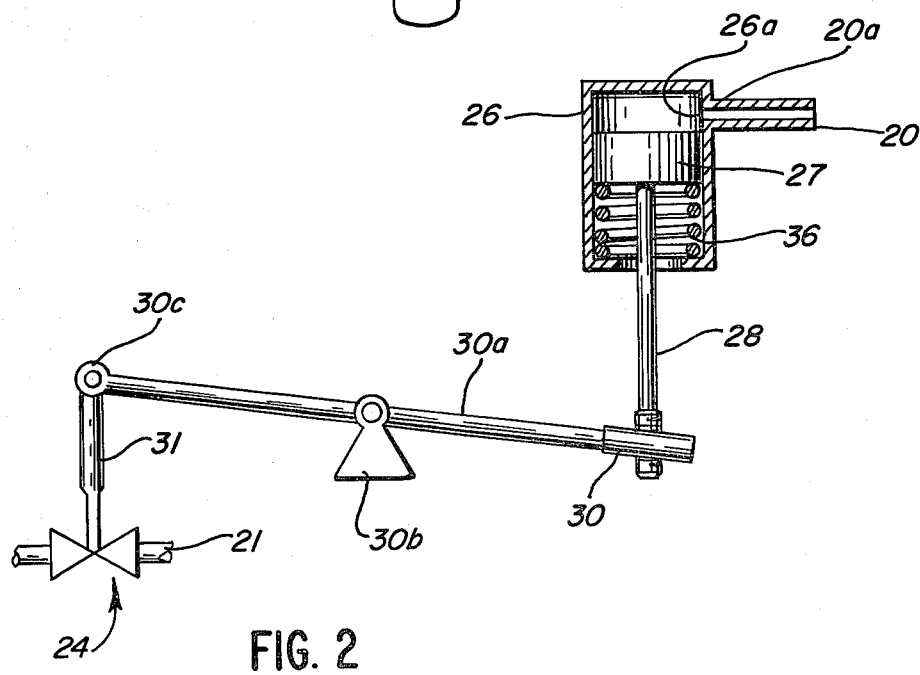
FIG. 2 is an enlarged fragmentary vertical sectional view of one form of a pressure-responsive metering valve utilized in the system of FIG. 1.

The responsiveness of the metering valve 24 to the variations in rail pressure is effected through a hydraulic piston-cylinder assembly 25. One end of the assembly cylinder 26, see FIG. 2, is provided with a port 26a to which is connected an end 20a of line 20. Slidably disposed within the cylinder 26 is a piston 27. The side of the piston 27 opposite port 26a is provided with a spring 36 to bias the piston 27 against the pressure from port 26a. Projecting externally from an end of the cylinder 26 is a rod 28 which is attached to one side of piston 27. The exposed end of the rod 28 is threadably attached to a suitable connector 30 and the rod side of piston 27 may be vented to the atmosphere.

Connector 30 is at one end of an arm 30a, pivotally mounted at 30b, which has the other end 30c pivotally connected to a valve stem 31. The opposite end of the valve stem 31 is secured to and operates a suitable metering valve 24 in such a manner that the valve opening is a direct function of the movement of the valve stem 31.

While adjustment of the metering valve 24 in the illustrated embodiment is produced by the hydraulic piston-cylinder assembly 25, other means for obtaining such adjustment can be utilized; for example, the valve piece could be operatively connected to the throttle lever, or the fuel rack of the engine or to some electronic sensing means embodied in the engine.

The extent to which the metering valve 24 is opened is dependent upon the movement of piston 27 within the cylinder 26. By adjusting the threaded connector 30 on the rod 28, the bias exerted on the piston 27 by spring 36 to retain the metering valve 24 in a closed position can be predetermined. Thus, the responsiveness of the metering valve 24 to the rail or fuel pressure within line 20 can be carefully controlled thereby controlling the ratio of the gas fuel to the liquid fuel being supplied to the engine when the switch is adjusted to a particular mode. Thus, the ratio of the dual fuels supplied to the engine will be consistent with the power demands imposed on the engine.

The mode in which the engine is operating—that is to say, whether it is fed only a single fuel or a mixture of two fuels—depends upon to which of two positions the electrical switch 37 is adjusted. Switch 37 has an adjustable lever 37a connected to a power source not shown, and two terminals 37b, 37c connected respectively to the solenoid actuating valve 15 and the solenoids actuating valves 18 and 22. Valve 22, when de-energized, normally assumes a closed position, thus shutting off flow of the compressed gas fuel from source S$_2$ through line 21 to the engine E. Also, when valve 18 is not energized—that is, when the switch lever 37a is out of contact with terminal 37c—the valve 18 will assume a closed position and prevent flow of the liquid fuel through line 17 to the engine. When lever 37a is out of contact with terminal 37b, valve 15 will assume a closed position whereby the liquid fuel flow will be diverted through valve 18. Switch 37 is preferably a two position type and may be actuated when the engine is operating. While the control for actuating the valves 15, 18, and 22 has been described as an electrical switch, it may instead be a pneumatic, hydraulic, or mechanical device which would cause adjustment of the valves.

The system as herein described utilizes two fuels, one of which is a liquid and the other compressed natural gas; however, it is not intended to be so limited. Another secondary source of fuel may be liquified petroleum gas (LPG).

When the engine E is started up with switch 37 in the mode wherein lever 37a is in contact with terminal 37c, piston 27 will be moved by the pressure in line 20 causing the valve 22 to open. When this occurs, the gaseous fuel from source S$_2$ will flow into line 21 leading to the air intake of the engine. During this time period, liquid fuel from S$_1$ is passing from pump 12 through valve 18 into feed line 17 and then to the injectors of the engine E. Upon the liquid fuel being injected in a timed sequence into the cylinders of the engine, it will ignite by reason of the high compression developed within the cylinders. The gas fuel simultaneously introduced into the cylinders will be ignited by the ignited liquid fuel. In such a sequence of events the injected liquid fuel functions as the ignition means for the second fuel.

As aforementioned, the ratio of the first fuel to the second fuel being fed to the engine can be varied as desired through adjusting various components of the metering valve 24 as previously described. It has been found, for example, in a Cummins V8 210 h.p. engine, presently available on the market and manufactured by Cummins Engine Company, Inc. of Columbus, Ind., that a liquid fuel to gaseous fuel ratio of 3 to 1 results in favorable operation of the engine. Other ratios wherein there is a greater proportion of the gaseous fuel are contemplated and will depend upon the size and type of engine and on the cost and availability of the fuels being utilized.

Thus, it will be noted that a control system for a duel fuel internal combustion engine has been disclosed which utilizes a simple and efficient fuel feed means wherein a compression ignition (diesel) engine can be readily modified to burn a predetermined proportion of a gaseous fuel as a source of power for the engine. Furthermore, the improved system has been provided wherein the ratio of the duel fuels supplied to the engine will be substantially consistent over the operating range of the engine and significant savings in liquid fuel costs will result.

I claim:

1. A control system for a dual fuel internal combustion engine, the latter having a first fuel source and a second fuel source under a predetermined pressure, said system comprising: primary means for metering fuel to the engine from the first fuel source as a function of engine load and operator demand; means for generating a control signal as a function of engine load; means for metering fuel from the second fuel source to the engine as a function of said control signal whenever it is desired to operate the engine in a dual fuel mode; and means responsive to operation of the engine in a dual fuel mode for modulating the fuel metered by said primary metering means by an amount which provides substantially the same fuel energy content delivered to the engine in the dual fuel mode as in the single fuel mode; said primary fuel metering means including a variable speed fuel pump, and a first feed line for connecting said pump to the engine, and said modulating means including means disposed in said first feed line for restricting flow a predetermined amount only when the engine is operating in the dual feed mode.

2. The control system of claim 1 wherein said flow restricting means comprises a first valve disposed in said first feed line, and a second feed line and second valve means having a predetermined restriction connected to said first feed line and in parallel flow relation to said first valve, and control means adjustable between two modes and operatively connected to said first and second valves and said second fuel source metering means, when in a first mode said control means effecting opening of said first valve and closing of said second valve means and termination of metering by said second fuel source metering means during the single fuel mode and when in a second mode said control means effecting closing of said first valve and opening of said second valve means and metering by said second fuel source metering means during the dual fuel mode.

3. The control system of claim 1, wherein said second fuel source metering means comprises a third feed line for connecting the second fuel source to the engine, a third valve disposed in said third feed line, and a metering valve disposed in said third fuel line in series flow relation to said third valve, the flow area of said metering valve being a function of said control signal and wherein said third valve is operatively connected to said control means to be opened and closed in synchronism with said second valve.

4. The control system of claim 3 wherein the first, second, and third valves are electrically energized solenoid valves.

5. The control system of claim 4 wherein the control means is a manually actuated two position electrical switch.

6. The control system of claim 1 wherein the first fuel is a liquid hydrocarbon.

7. The control system of claim 1 wherein said second fuel source metering means comprises: means for selectively permitting or blocking flow of fuel from second fuel source to the engine, a variable area metering valve for metering fuel from the second fuel source to the engine as a function of a displacement input, and an actuator operatively connected to said metering valve and being responsive to said signal for increasing the area thereof as the signal increases.

8. The control system of claim 7 wherein said control signal is in fluid pressure form, said actuator comprises a cylinder and piston displaceable therein, a spring urging the piston in a first direction, said control signal being connected to said cylinder in opposition to said spring to producing a predetermined displacement of the piston in response to increase in signal pressure, and a mechanical linkage of connecting the piston to said metering valve so that an increase in signal pressure increases the opening of said metering valve.

9. The control system of claim 8 wherein said mechanical linkage has an adjustable link for adjusting the response of said piston to variations in signal pressure.

10. The control system of claim 7 wherein said actuator is responsive to a fluid pressure signal, said fuel pump produces an output fuel pressure that is a direct function of engine load, and said control signal generating means comprises a means for connecting the output of said fuel pump to said metering valve means, the metering valve means metering an increasing amount of fuel from the second source in response to an increase in the control signal.

11. A control system as in claim 8 wherein said fuel pump produces an output fuel pressure that is a direct function of engine load and said control signal generating means comprises a means for connecting the output of said fuel pump to the cylinder.

* * * * *